United States Patent
Hoflehner et al.

(10) Patent No.: US 7,647,482 B2
(45) Date of Patent: Jan. 12, 2010

(54) METHODS AND APPARATUS FOR DYNAMIC REGISTER SCRATCHING

(75) Inventors: Gerolf Hoflehner, Santa Clara, CA (US); Mark Davis, Belmont, MA (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 11/395,373

(22) Filed: Mar. 31, 2006

(65) Prior Publication Data

US 2007/0234012 A1 Oct. 4, 2007

(51) Int. Cl.
*G06F 12/00* (2006.01)
(52) U.S. Cl. ...................................... 712/220
(58) Field of Classification Search ................ 712/220; 711/132; 719/312
See application file for complete search history.

(56) References Cited

U.S. PATENT DOCUMENTS

| | | | |
|---|---|---|---|
| 6,018,799 A * | 1/2000 | Wallace et al. | 712/300 |
| 6,487,630 B2 * | 11/2002 | Bui | 711/109 |
| 6,557,093 B2 * | 4/2003 | Vlot et al. | 712/202 |
| 6,643,662 B1 * | 11/2003 | Farago et al. | 707/101 |
| 6,654,871 B1 * | 11/2003 | Aidan et al. | 712/202 |
| 6,665,793 B1 * | 12/2003 | Zahir et al. | 712/228 |
| 6,907,601 B1 * | 6/2005 | Hoflehner et al. | 717/151 |
| 7,120,775 B2 * | 10/2006 | Liu et al. | 711/170 |
| 2003/0217356 A1 * | 11/2003 | Baraz et al. | 717/158 |

OTHER PUBLICATIONS

Adl-Tabatabai,,Ali-Reza , Fast Effective Code generation in a Just in Time Java Compiler, 1998, ACM pp. 280-290.*
Briggs, P, etal. Improvements to Graph Coloring Register Allocation 1994, ACM, p. 428-455.*
Davidson ,Jack W. etal, Methods for Saving and Restoring Register Values across Function Calls, Feb. 1991, Software-Practice and Experience, John Wiley & Sons, Ltd vol. 21(2) pp. 149-165.*
Martin, Milo M. etal., Exploiting Dead Value Information 1997, IEEE pp. 125-135.*
Goodman, J.R. etal., Code Scheduling and Register Allocation in Large Basic Blocks, 1988, ACM, pp. 442-452.*
Reig, Fermin, Annotations for Portable Intermediate Languages, 2001, Elsevier Science, 14 pages.*
Chow, F.C., etal., Priority-Based Coloring Approach to Register Allocation, 1990, ACM, ACM transactions on Programming Languages and Systems, vol. 12, No. 4, pp. 501-536.*
Weldon, D.R., etal., Quantitative Evaluation of the Register Stack Engine and Optimizations for Future Itanium Processors, 2002, IEEE, 11 pages.*

* cited by examiner

Primary Examiner—Eric Coleman
(74) Attorney, Agent, or Firm—Hanley, Flight & Zimmerman, LLC

(57) ABSTRACT

Apparatus and methods of reducing dynamic memory stack by a register stack engine are disclosed. An example apparatus and method identifies a local parameter of a caller function. A scratch register corresponding to the local parameter is moved to the top of a register stack, and a local parameter of a callee function is assigned to the scratch register.

15 Claims, 4 Drawing Sheets

METHODS AND APPARATUS FOR DYNAMIC REGISTER SCRATCHING

FIELD OF THE DISCLOSURE

This disclosure relates generally to processor memory register management and, more particularly, to systems and methods to decrease memory traffic on dynamic register stacks.

BACKGROUND

Microprocessors use registers to hold values of variables that are used in connection with the execution of instructions. The speed of instruction execution is, at least in part, dependent on the speed of access to data (e.g., variable values) stored in registers. Microprocessors typically have a number of physical on-chip registers, which can be accessed much more rapidly than memory. Generally, it is desirable to use the physical on-chip registers for executing instructions because such on-chip registers can be accessed more quickly, thereby decreasing instruction execution times.

In certain processors such as the Intel® Itanium® processor, the on-chip registers are divided into static registers and stacked registers. A register stack engine defines a register stack as a limited number of stacked registers (e.g., ninety six in the case of the Itanium® processor) referred to as architectural registers. The register stack engine thus maps architectural stacked registers to physical registers. The physical registers allocated in the stack may be written to and then overwritten by subsequent instructions. The register stack engine may store and load the values of stacked registers to and from memory at function entries and exits.

At a function entry to the processor, a special instruction, (e.g., "alloc") allocates the registers on the register stack for incoming parameters, temporal or local parameters and outgoing parameters that are needed for function calls. The incoming, local and outgoing parameters are used to store variables needed to execute the function and are referred to as architectural registers used by machine instructions. A result register is used by the alloc instruction to store the previous function state register. When the function exits, the previous function state register is used to restore the original values in the stacked registers for further use. The restoration of data to registers from memory increases bus traffic and slows instruction execution.

Processors such as the Intel® Itanium® processor have a finite number of stacked registers. The Itanium® processor may allocate 96 stacked registers for immediate access at a function entry. However, this quantity of registers may be insufficient for executing complex applications with many instructions. Thus the register stack engine must save the contents of stacked registers to memory and restore the contents of such registers from memory. However, access to memory is time consuming and slows instruction execution.

In operation, processor functions execute the alloc instruction to allocate registers for a function. The register stack engine first allocates stack registers and uses memory to store stacked registers from previous instructions when the stack registers have been exhausted. In practice, many applications are complex and the stack registers are frequently exhausted resulting in many memory store and restore actions. Thus, instruction execution is slowed by the register stack engine access to memory.

DETAILED DESCRIPTION

In general, the methods and apparatus described herein include identifying a local parameter of a caller function and moving a scratch register corresponding to the local parameter to the top of a register stack. A local parameter of a callee function is then assigned to the scratch register.

Figure 1:
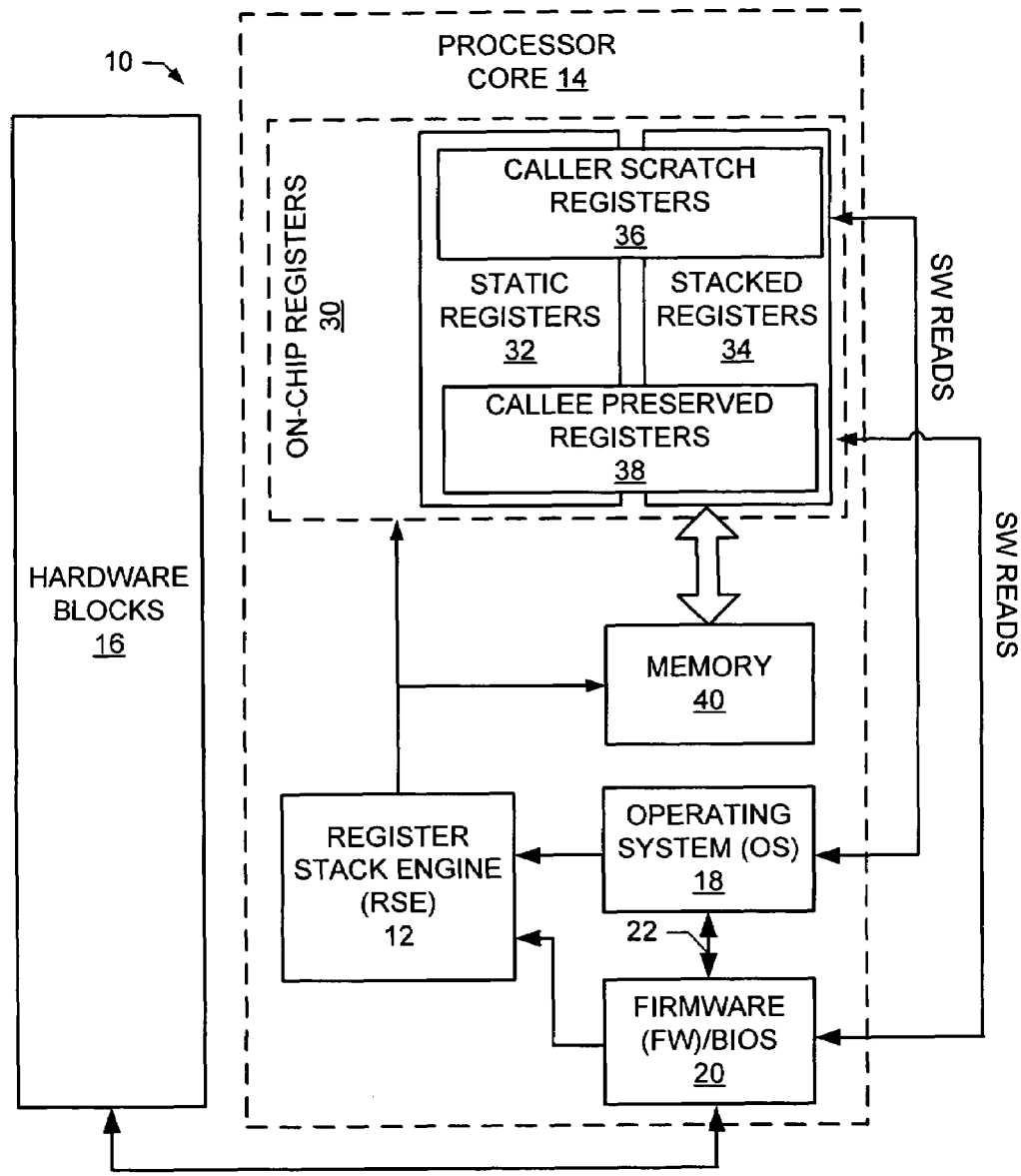
FIG. 1 is a block diagram of an example processor system that uses an example scratch register method to allocate registers.

FIG. 1 is a block diagram showing an example processor system 10 with a register stack engine 12 ("RSE"). In the example of FIG. 1, the register stack engine 12 is implemented within a semiconductor package that includes, among other things, one or more of any variety of processor cores, one of which is shown at reference numeral 14, and one or more hardware blocks 16. The processor core(s) 14 may be any type of processing unit such as, for example, a microprocessor core from any of the Intel® families of microprocessors (e.g., the Itanium® family). In the illustrated example, the hardware blocks 16 include circuits, circuit blocks, logic, etc. that implement functionality commonly provided by one or more chips located external to the processor system 10. Example hardware blocks 16 are memory controllers, video graphic adapters, input/output (I/O) controller hubs (ICH), network interfaces, etc. Additionally or alternatively, the hardware blocks 16 may include circuits, circuit blocks, logic, etc. implemented by and/or within any of the processor cores. The processor core(s) 14 and the hardware blocks 16 may be implemented on a common substrate or may be implemented on one or more substrates and then combined, using any of a variety of techniques, into a multi-chip module (MCM). Alternatively, some of the structure of FIG. 1, including, by way of example, but not limited to the hardware blocks 16, may be located off-chip and coupled to the processor core(s) 14 via a bus or other connection device.

As is conventional, the processor core(s) 14 execute machine readable instructions to implement an operating system (OS) 18 or basic input/output system (BIOS) 20. For instance, in an example processor system 10, the multiple processor cores 14 may collectively execute machine readable instructions to implement the OS 18. As such, the relationship shown in FIG. 1 between the processor core(s) 14, the OS 18 and the BIOS 20 is merely illustrative of one example implementation. The BIOS 20 is typically implemented using firmware and, thus, the term FW will be used herein to refer to the BIOS 20.

In the example of FIG. 1, the FW 20 handles configuration and/or control of the hardware blocks 16 using any of a variety of techniques. Alternatively, other machine readable instructions executed by the processor core(s) 14 may configure and/or control the hardware blocks 16. In some implementations, the FW 20 may hide some or all aspects of the hardware blocks 16 from the OS 18. For example, the OS 18 may operate without specific knowledge of the implementation details (e.g., configuration registers, status registers, etc.) of the hardware blocks 16. The OS 18 and the FW 20 may optionally implement an interface 22 that allows the OS 18 to, for example, access registers and/or data normally only accessible to the FW 20. The example interface 22 of FIG. 1 may be implemented by, for example, an extended firmware interface (EFI), a FW runtime service, any variety of virtual machine monitor (VMM) and/or hypervisor executing between the OS 18 and the FW 20, etc.

The processor system 10 includes on chip registers 30 that may be used to store variables for instruction execution by the OS 18 and/or the FW 20. The on chip registers include static registers 32 and stacked registers 34 which are partitioned into two different register types, (caller) scratch registers 36 and (callee) preserved registers 38. The processor system 10 also includes a memory 40. In the illustrated example, the memory 40 is random access memory (RAM) or cache memory. Of course other types of memory devices may be used for the memory 40. The (caller) scratch registers 36 are volatile over function calls. For example, on the Intel® Itanium® the maximal 8 incoming parameters and outgoing parameters on the register stack are of scratch register type. In this example, the processor system 10 has eight incoming scratch registers. However, different numbers of caller scratch registers may be used.

Allocation of the register stack is managed by the register stack engine 12. The registers of the register stack are accessible by the application run by the processor core 14 for the purpose of executing instructions. Although shown as a separate block in FIG. 1, persons of ordinary skill in the art will appreciate that the register stack is actually representative of a set of registers physically located in the registers 36 and 38.

Figure 2A:
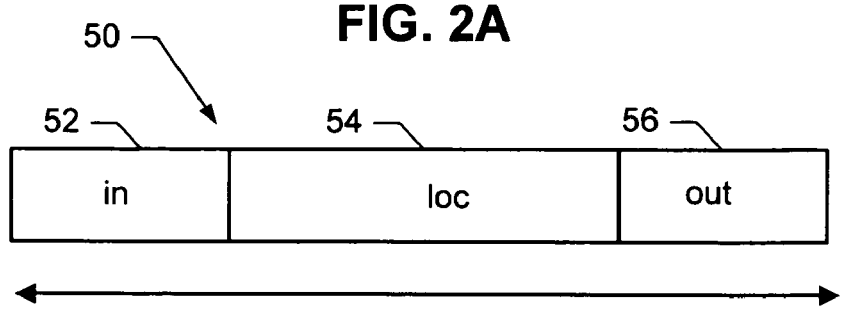
FIGS. 2A-2C are block diagrams of an example allocation instruction for an initial instruction and a subsequent instruction.

FIG. 2A shows an example allocation instruction 50 that may be used by the register stack engine 12 to allocate registers on the register stack. The allocation instruction 50 allocates registers for incoming parameters 52, registers for temporal or local parameters 54 and outgoing parameters 56. The outgoing parameters 54 are needed for function calls from the processor system 10. Such an allocation instruction may be coded as:

Alloc r=ar.pfs, in, loc, out

Where "in" is the number of registers for the incoming parameters 52, "loc" is the number of temporal or local parameters 54 and "out" is the number of registers for outgoing parameters 56. The result register, "r" is used to store the state register of the previous function. The result register is used to restore the original values of the register (ar.pfs) and is a writable general register.

The stacked parameter registers of the calling function and the previous function overlap. For example, the following functions in the Itanium® processor use overlapping registers for up to the eight caller scratch registers in the Itanium® processor. Of course, any number of caller scratch registers may be used in different types of processors:

```
Foo ( ) {
    Alloc 0, 78, 2;
    ...
    Bar (a, b);
}
Bar (int p1, int p2) {
    Alloc 2, 38, 0;
    ...
    Return;
}
```

In this example, 80 registers are allocated at the entry of the foo function, 78 local parameters and 2 outgoing parameters. A total of 118 registers are allocated at the entry of the bar function, 2 incoming parameters and 38 additional local parameters. The two incoming parameter registers of the bar function are the same as the 2 outgoing parameter registers associated with the foo function. After the processor system 10 returns from executing the bar function, 80 registers are allocated representing the registers allocated by the foo function.

Figure 2B:
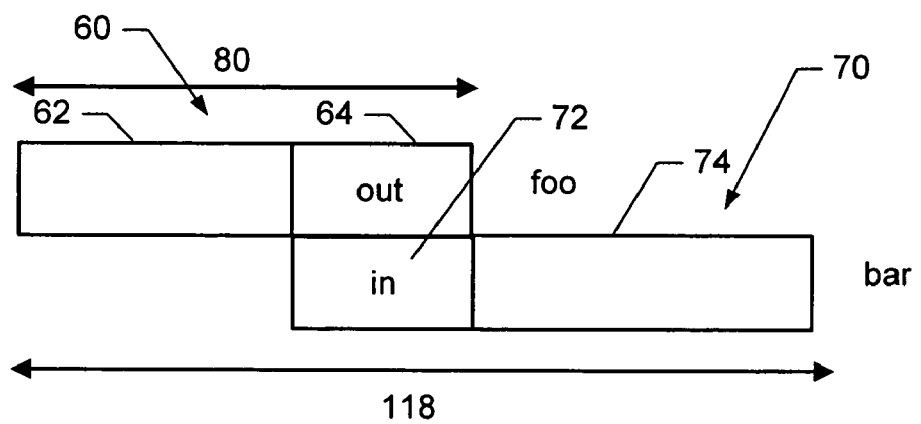
Figure 2C:
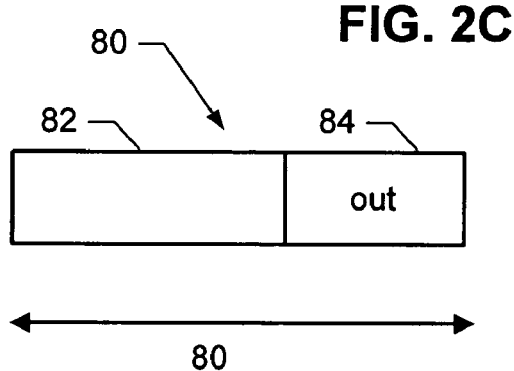

FIG. 2B is a register stack snap shot for the register calls in the above example. FIG. 2B shows a "foo" function register allocation instruction 60 having a local parameters block 62 and an outgoing parameters block 64, each representing the number of registers needed to store the respective parameters necessary to implement the function. A "bar" register allocation instruction 70 has an incoming parameters block 72 and a local parameters block 74, each representing the number of registers needed to store the respective parameters necessary to implement the function. After the return from the "bar" function as shown in FIG. 2C, the allocation of registers remains 80 registers as shown in a return block 80 with the local parameters block 82 having 78 registers and the 2 registers in an outgoing parameters block 84.

Registers on the register stack are both callee preserved registers 38 and caller scratch registers 36 in FIG. 1. The caller scratch registers 36 are the out parameter registers and may be overwritten by the callee function, but the callee preserved registers 38 cannot be overwritten and, thus, additional registers must be spilled to memory. Spilling refers to the additional allocation of data stored in a preserved register 38 to the memory 40 in FIG. 1, which creates memory traffic. The number of registers that must be spilled can be reduced or minimized by reducing the number of preserved registers.

In the above example, the caller function, "foo," writes certain registers in the scratch registers 36, which may then be overwritten by the callee function, "bar" without having to generate memory traffic. Thus, by identifying variables that may be assigned scratch registers and moving them to the top of the register stack together with the out parameters, all the registers on top of the register stack effectively become outgoing registers that can be overwritten by the incoming and local parameters of the callee function, thereby reducing the overall register stack engine memory traffic. The process of identifying or finding the scratch registers allocates the scratch registers 36 to the top of the register stack for the callee function and reduces the number of registers that must be spilled.

Figure 3:
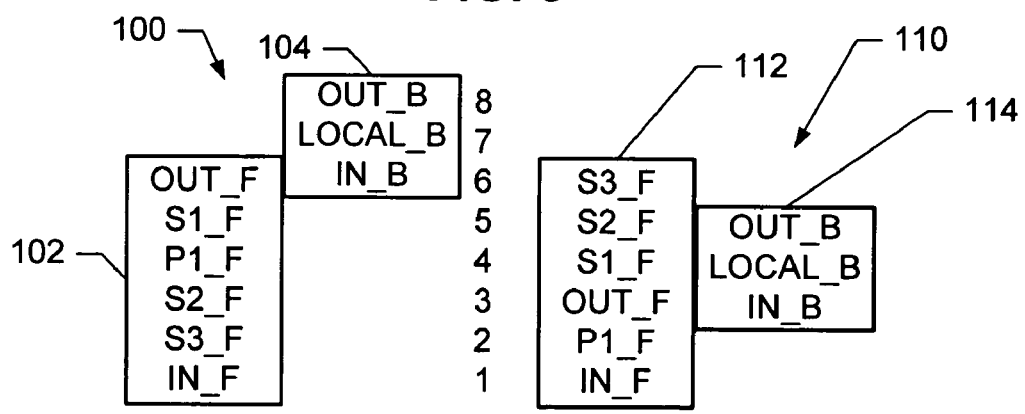
FIG. 3 is a block diagram illustrating the typical allocation of registers by a processor and using the example scratch register allocation method.

FIG. 3 shows a comparison between a register stack 100 without using the example register scratching process and a register stack 110 using the example register scratching process. In the example shown in FIG. 3, the caller function, "foo" requires 6 registers and the callee function, "bar," requires 3 registers. In the case where no register scratching is used, the register stack 100 first allocates 6 registers in a caller register allocation 102 for the caller function, "foo." The local parameters for the caller function, "foo" in this example, are written to registers, S1_F, P1_F, S2_F and S3_F in the caller register allocation 102. These registers allocated for the caller function are a mix of preserved registers (P1_F), which contain values which may not be destroyed by the callee function bar, and scratch registers (S1_F, S2_F and S3_F), which may be destroyed by a callee function, e.g. bar in FIG. 2B. In a normal processor, the local parameters are a random stack of scratch and preserved register types. The memory is used if the number of physical (static and stacked) registers is used up. All the registers on the register stack 100 except for OUT_F in FIG. 3 may get spilled to memory, if there is not enough room for the stacked registers of the callee in the stacked registers.

A callee register allocation 104 for the callee function, "bar," requires 3 registers. In the register stack 100, the in parameter register (IN_B) of the callee register allocation 104 overlaps the out parameter register (OUT_F) of the caller register allocation 102. However, an additional two registers are required for the local parameter register (LOCAL_B) and the out parameter register (OUT_B) of the callee register allocation 104. Thus, the register stack 100 requires 8 registers to perform the callee function, "bar."

By pushing the scratch registers to the top of the register stack as shown in the register stack 110, the scratch registers may be used for local parameters in the callee function. A modified caller register allocation 112 has pushed the scratch registers (S1_F, S2_F and S3_F) to the top of the register stack 110 (registers 4-6).

When the "bar" callee function is executed, as with the register stack 100, the in parameter register (IN_B) of a callee register allocation 114 overlaps the out parameter register (OUT_F) of the caller register allocation 112 as in the previous description. However, other registers required by the callee register allocation 114 may overlap with registers of the caller register allocation 112. For example, the out parameter (OUT_B) and the local parameter (LOCAL_B) of the callee register allocation 114 are written into scratch registers (S1_F and S2_F). Thus only 6 registers are needed to perform the "bar" callee function using the example scratch register allocation process. This results in a reduction in register stack engine traffic because fewer registers must be dynamically allocated.

Figure 4:
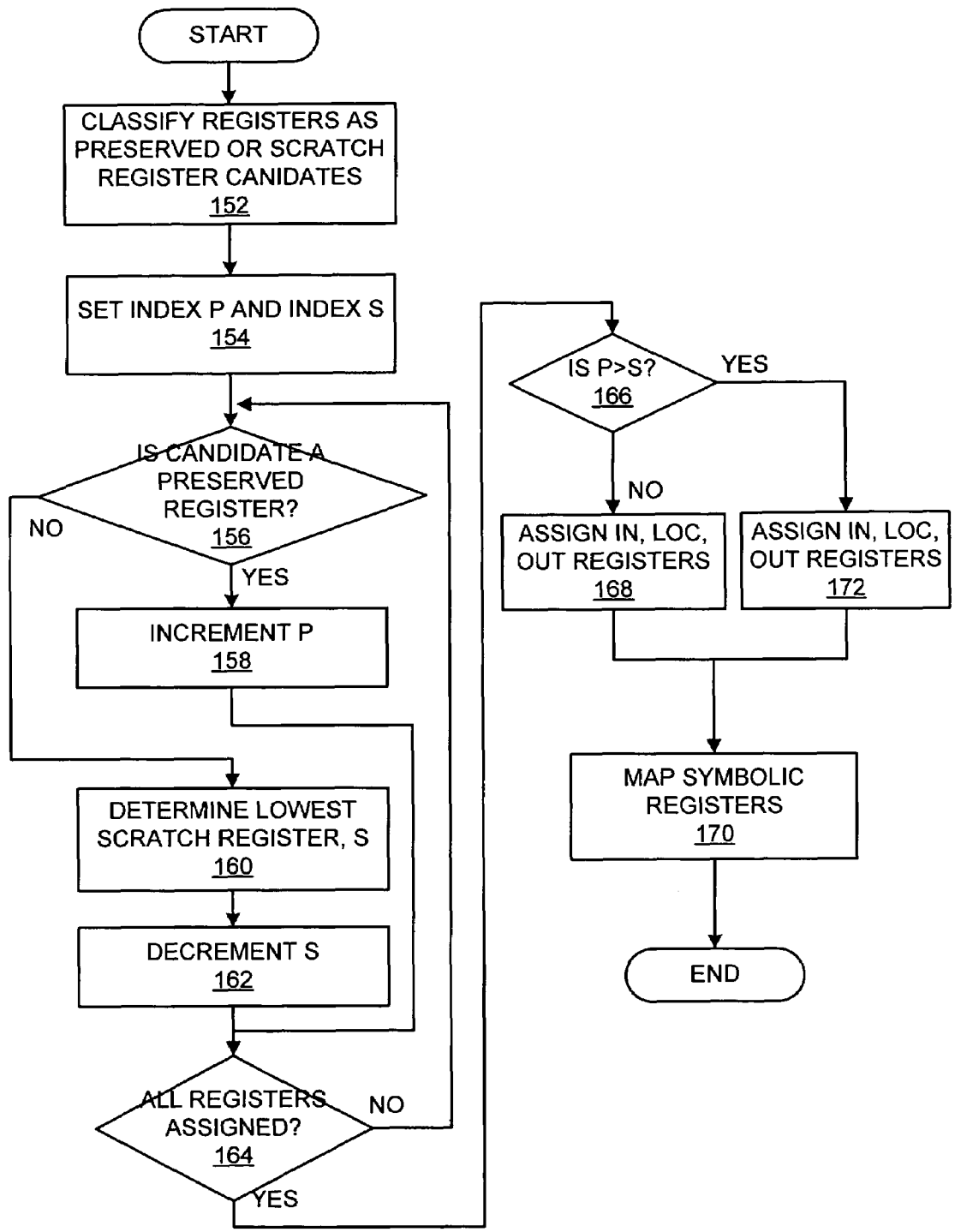
FIG. 4 is a flow diagram representation of example machine readable instruction which may be executed to allocate registers.

FIG. 4 is a flow diagram depicting an example process that may be used to select and prioritize scratch registers in the illustrated example of FIG. 3. The process in FIG. 4 may be performed with the register allocation algorithm explained above to insure that the scratch registers are at the top of the register stack when functions are executed. Initially, the register parameter candidates, which correspond to program variables, are classified as preserved or scratch register candidates (block 152). However, other types of registers may be classified at block 152. A register parameter candidate is marked as "preserved" when its value may not be overwritten by a callee function. Otherwise a register parameter candidate is marked as "scratch."

The process creates a symbolic register stack with index P, which is initially the lowest available register at the bottom of the stack, and index S, which is initially the highest available register at the top of the stack (block 154). The process loops over all register parameter candidates. In block 156, if the register candidate is marked as "preserved", the process starts searching for the lowest available preserved register at the bottom of the stack and increments P if necessary (block 158). The process then loops to block 164. If the register candidate is not marked as preserved, the register candidate is marked as "scratch", the process starts searching for the highest available scratch register at the top of the stack (block 160) and decrements S if necessary (block 162). The process then determines if there are any additional unassigned register parameter candidates (block 164). If there are additional unassigned register parameter candidates, the process loops back to block 156. The process thus continues while there are unassigned register parameter candidates. After all of the register candidates are assigned a register, the index S holds the lowest stacked register used for any scratch register and the index P holds the highest stacked register used for any preserved register.

If there are no remaining unassigned registers in block 164, the process then composes a final register stack layout starting at block 166. The process determines whether the preserved and scratch registers overlap (block 166). In the case where the preserved and scratch registers do not overlap, the final register stack is determined (block 168). At block 168, the in parameters from the allocation instruction are assigned to the lowest registers. The local parameter registers are assigned by taking the P index (i.e., the highest number stacked register) to determine the number of preserved registers after the in parameter registers to store the local parameters. At block 168, the out parameter registers take the number of needed parameters. The first scratch register to be used is determined by taking the top of the stack minus index S (i.e., the lowest stacked registers used for a scratch register) plus one. The process then proceeds to block 170 where the symbolic registers determined above are mapped to the actual architectural registers of the register stack 40 in FIG. 1.

In the case where the preserved and scratch registers overlap at block 166, the final register stack allocates the in parameters to the bottom of the stack. At block 172, the local parameters are allocated to the next register after the last in parameter and are allocated P registers. The out parameters require the total number of out parameters plus the register at the top of the stack minus the S index (i.e., the lowest scratch register) plus one to determine the first register available for scratch registers. The process then proceeds to block 170 and maps the symbolic registers to the architectural registers.

Another example of use of the register scratching to minimize memory calls is the process of color definition for an interference graph for the purpose of register allocation for executing processor instructions. For multiple instructions, register allocation is used to map the theoretically unlimited symbolic registers (i.e., variables used by instructions) into a finite number of machine or physical registers. Using graph coloring, a register allocation routine constructs an interference graph that represents these constraints. Program variables are represented by nodes in the interference graph and edges between nodes imply that those values cannot share a physical register. Values that cannot share a physical register are said to interfere with each other. K represents the number of physical registers available to hold the variables. The interference graphing process typically has six phases, renaming, building, coalescing, simplifying, spilling and coloring, which may use the example method to decrease the time for memory allocation.

Figure 5:
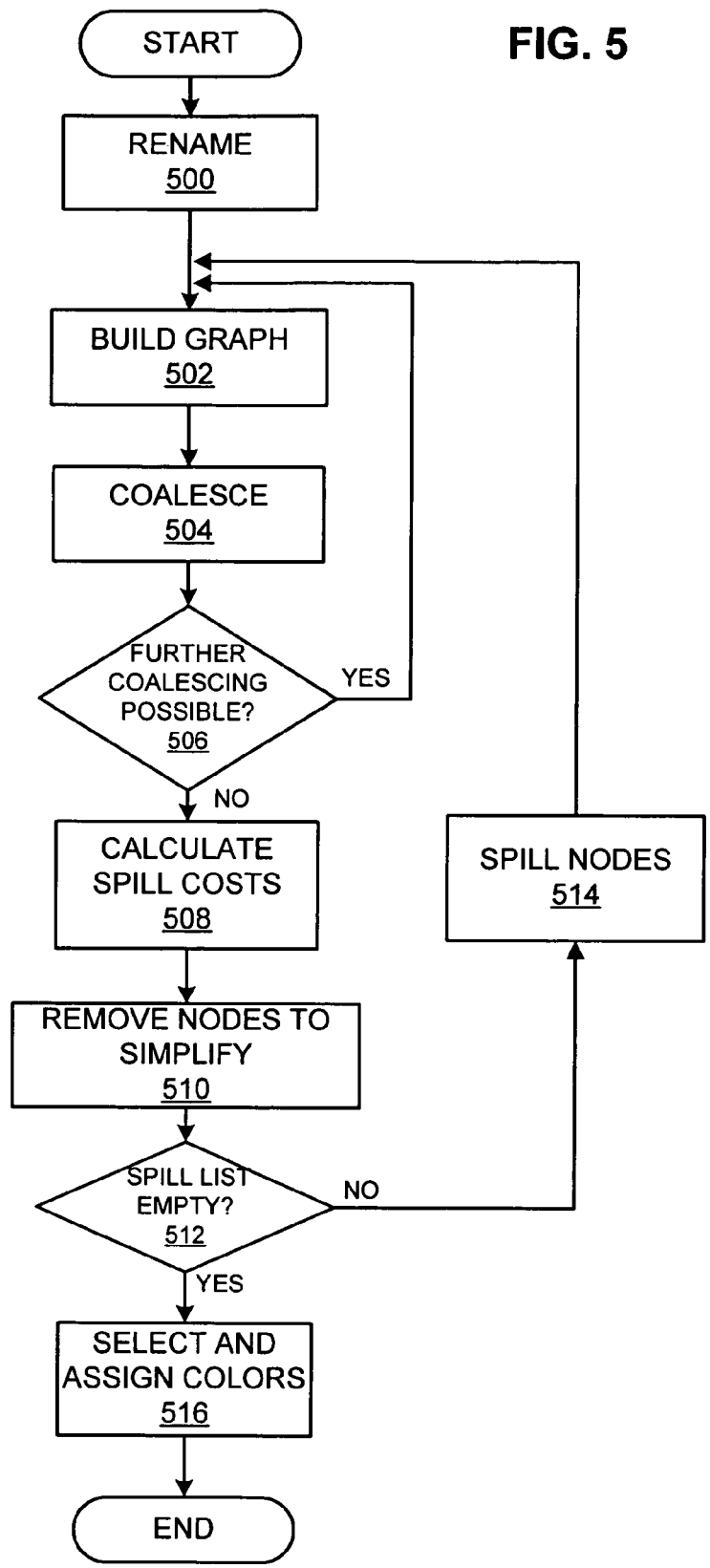
FIG. 5 is a flow diagram illustrating the application of the example register scratching process in an interference graph register allocation method.

FIG. 5 shows an example Chaitin type interference graphing process used to allocate variables to registers for a series of program instructions. As shown in FIG. 5, in the renaming phase (block 500), each symbolic register corresponds to a simple register candidate node (a live range). At block 502, an interference graph is built by employing a liveness analysis finding variables (symbolic registers) that are live over the course of all of the program instructions. These live ranges become the nodes in the interference graph. Interferences are marked between the live ranges when live ranges overlap. In this case, they cannot be assigned the same physical register. In the coalescing phase at block 504, nodes are fused to consolidate the common nodes where source and destination registers do not interfere. The process then determines whether further nodes may be coalesced at block 506. If further nodes may be coalesced, the process branches back to block 504. If no further nodes may be coalesced at block 506, no further coalescing can occur to build the graph the graph in block 502 and the process proceeds to block 508.

In the simplification phase (block 508), the nodes of the interference graph are analyzed using simple graph theory to collect register candidates that can be allocated to registers by an interactive process to calculate the spill costs. When a register candidate has fewer than K interference edges (i.e., a node has fewer than K neighbors), then it can be assigned a register. These low degree nodes and their edges are removed from the interference graph and pushed on a coloring stack (block 510). In block 510, when no low degree node is available, a high degree node also is chosen (based on a cost function) to be removed with its interference edges which may result in further low degree nodes. The removed high degree nodes are placed on a spill list. When the spilled node and its edges have been removed from the interference graph, new low degree nodes may be produced and thus the process in block 510 iterates until all nodes are placed either on the coloring stack or on the spill list.

In block 512, the process determines if the spill list is not empty. If the spill list is not empty, the high degree nodes are spilled in block 514. If the spill list is empty, one node at a time is picked from the top of the coloring stack and a color (physical register) is assigned to the node (symbolic register or variable) until all nodes are assigned registers in the coloring phase (block 516). During the color assignment at block 516 the process in FIG. 4 may be invoked. The process at block 516 terminates when all nodes have been assigned registers or have been spilled to memory.

In using the example process, the minimal number of preserved registers necessary are placed in the stack leaving scratch registers at the top of the register stack.

As an alternative to implementing the methods and/or apparatus described herein in a system such as the device of FIG. 1, the methods and/or apparatus described herein may alternatively be embedded in a structure such as processor and/or an ASIC (application specific integrated circuit).

As is known in the art, any of the foregoing machine readable instructions may be implemented on a computer readable medium including, but not limited to, a magnetic storage device, an optical storage device, a hard disk drive and/or a solid state storage device.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   identifying a local parameter of a caller function to be a scratch register candidate;
   identifying an out parameter of the caller function in an out parameter register on a register stack;
   moving the scratch register candidate higher in the register stack than the out parameter register;
   moving a second local parameter of the caller function in a preserved register to the bottom of the register stack;
   assigning an in parameter of a callee function to the out parameter register; and
   assigning a local parameter of the callee function to the scratch register candidate, wherein the scratch register candidate is adjacent the out parameter register on the register stack.

2. The method of claim 1 further comprising:
   reading a plurality of instructions including the caller function and the callee function; and
   determining a live range from the plurality of instructions.

3. The method of claim 2 further comprising:
   designating additional preserved registers and scratch register candidates; and
   moving the additional preserved registers to the bottom of the stack and the additional scratch register candidates to the top of stack.

4. The method of claim 3, further comprising:
   performing the designation of additional preserved and scratch register candidates for the live ranges from the instructions; and
   determining if the total number of preserved registers and stack register candidates exceeds a total number of registers in the register stack.

5. The method of claim 4 wherein the assignment of preserved registers and scratch register candidates is used to color an interference graph to assign registers.

6. An apparatus comprising:
   a processor;
   a plurality of on-chip registers coupled to the processor core; and
   a register stack engine coupled to the on-chip registers and the processor to:
      identify a local parameter of a caller function to be a scratch register candidate;
      identify an out parameter of the caller function in an out parameter register on a register stack;
      move the scratch register candidate higher in the register stack than the out parameter register;
      move a second local parameter of the caller function in a preserved register to the bottom of the register stack;
      assign an in parameter of a callee function to the out parameter register; and
      assign a local parameter of the callee function to the scratch register candidate, wherein the scratch register candidate is adjacent the out parameter register on the register stack.

7. The apparatus of claim 6, wherein the processor is to determine a live range from at least two instructions.

8. The apparatus of claim 7 wherein the register stack engine is further to assign a live range to the preserved register.

9. The apparatus of claim 8, wherein the register stack engine is to assign additional preserved registers to the bottom of the register stack and additional on-chip registers to the top of the register stack.

10. The apparatus of claim 9, wherein the register stack is to assign preserved registers and scratch register candidates to color an interference graph to assign registers.

11. An article of manufacture comprising a computer readable medium storing machine readable instructions which, when executed, cause a machine to:
   identify a local parameter of a caller function to be a scratch register candidate;
   identify an out parameters of the caller function;
   identify an out parameter of the caller function in an out parameter register on a register stack;

move the scratch register candidate higher in the register stack than the out parameter register;
move a second local parameter of the caller function in a preserved register to the bottom of the register stack;
assign an in parameter of a callee function to the out parameter register; and
determine a lowest stacked register of the one or more moved scratch registers;
assign an in parameter of a callee function to an out register corresponding to the out parameter below the lowest stacked register; and
assign a local parameter of the callee function to the scratch register candidate, wherein the scratch register candidate is adjacent the out parameter register on the register stack.

12. The article of manufacture of claim 11, wherein the instructions, when executed, further cause the machine to:
read a plurality of instructions including the caller function and the callee function; and
determine a live range from the plurality of instructions.

13. The article of manufacture of claim 12, wherein the instructions, when executed, further cause the machine to:
designate additional preserved registers and scratch register candidates; and
move the additional preserved registers to the bottom of the stack and the additional scratch register candidates to the top of stack.

14. The method of claim 1 further comprising determining a lowest scratch register candidate on the register stack.

15. The method of claim 14 wherein the local parameter of the callee function is assigned to the lowest scratch register candidate on the register stack.

* * * * *